United States Patent [19]

Kamiya et al.

[11] Patent Number: 5,388,045
[45] Date of Patent: Feb. 7, 1995

[54] SELF-DIAGNOSTIC APPARATUS OF VEHICLES

[75] Inventors: Kenji Kamiya, Anjo; Katsumi Takaba, Obu, both of Japan

[73] Assignee: Nippondenso Co., Ltd., Kariya, Japan

[21] Appl. No.: 111,918

[22] Filed: Aug. 26, 1993

[30] Foreign Application Priority Data

Aug. 27, 1992 [JP] Japan .................. 4-252259

[51] Int. Cl.6 .............................. G06F 15/74
[52] U.S. Cl. ................. 364/424.04; 364/424.03; 364/551.01; 340/438
[58] Field of Search ........... 364/550, 551.01, 424.03, 364/424.04, 431.01; 73/117.2, 117.3; 340/438, 439, 436

[56] References Cited

U.S. PATENT DOCUMENTS

| | | | |
|---|---|---|---|
| 4,638,289 | 1/1987 | Zottnik | 340/436 |
| 4,839,811 | 6/1989 | Kanegae et al. | 364/431.01 |
| 4,924,391 | 5/1990 | Hirano et al. | 364/551.01 |
| 4,939,652 | 7/1990 | Steiner | 340/438 |
| 5,111,686 | 5/1992 | Kamiya et al. | 73/117.3 |
| 5,218,543 | 6/1993 | Komatsu | 364/424.04 |
| 5,249,127 | 9/1993 | Komatsu | 340/438 |
| 5,276,619 | 1/1994 | Ohara et al. | 364/424.04 |

FOREIGN PATENT DOCUMENTS

| | | |
|---|---|---|
| 57-64814 | 4/1982 | Japan . |
| 58-5834 | 1/1983 | Japan . |
| 62-142849 | 6/1987 | Japan . |
| 63-70171 | 3/1988 | Japan . |
| 63-90738 | 4/1988 | Japan . |
| 3-92564 | 4/1991 | Japan . |

*Primary Examiner*—Gary Chin
*Attorney, Agent, or Firm*—Cushman, Darby & Cushman

[57] ABSTRACT

A self-diagnostic apparatus of vehicles which allows frozen diagnostic data to reflect correctly and efficiently a vehicle state upon the detection of an abnormality. A control unit has a CPU and a RAM which holds stored data even when the ignition key is turned off. The CPU detects an abnormality of individual on-board devices and when an abnormality of a device is detected, it stops updating diagnostic data and maintains data immediately prior to the detection of the abnormality. When updating of diagnosis data is not stopped, the contents of the RAM is updated at a predetermined updating period of time with diagnostic by data necessary for analyzing the device abnormality. The updating period becomes shorter as the rate of change of the diagnostic data grows larger. Through this, an adequate amount of diagnostic data near a time point at which the device abnormality occurs can be reliably and efficiently stored for later retrieval.

8 Claims, 10 Drawing Sheets

NE

ΔNE

VTA

SPD

FF
CDIAG
00

DATA STORING TIMING   a  b  c d e f g  h

OCCURRENCE OF FAULT AND FREEZING

SELF-DIAGNOSTIC APPARATUS OF VEHICLES

BACKGROUND OF THE INVENTION

1. Field of the Invention

The present invention relates to a self-diagnostic apparatus of a vehicle for storing and holding diagnostic data necessary for an analysis of abnormality in a vehicle on-board device.

2. Description of Related Art

Present-day electronization of vehicles is remarkable and devices carried on individual components of a vehicle including an engine are coupled to each other by means of a control computer and perform complicated operations.

In this case, even with an abnormality in the operation of a single on-board device detected, a true cause of the abnormality as related to other on-board devices often cannot be determined unless data indicative of a vehicle state subject to the abnormality (diagnosis data) is collected over a wide range. Also, operation sometimes recovers normality naturally after a temporary abnormal operation and this often becomes a predictive phenomenon of a total fault; but a cause of the phenomenon is very difficult to find out through an inspection conducted after the driver alights from the vehicle.

Accordingly, in JP-A-62-142849 and JP-A-63-90738, a self-diagnostic apparatus has been proposed wherein diagnostic data of individual vehicle components is updated and stored at predetermined intervals of time in a memory which holds the contents of the diagnostic data even when the ignition switch is turned off, and after an abnormality of an on-board device is detected inhibiting, updating of the above-said memory contents (frozen) in order that a cause of the abnormality can be grasped correctly after the driver alights from the vehicle.

Also proposed in JP-A-3-92564 is an apparatus wherein in addition to the diagnostic data, a control program is also stored in the memory in an atempt to grasp a more correct cause of the abnormality.

In any of the aforementioned apparatus' in which diagnostic data is read and stored at a predetermined period of time (every constant time or every constant engine revolution number), however, the diagnostic data changes greatly within a short time during a transient operation of a vehicle or of an engine and diagnostic data which is frozen upon the detection of the device abnormality sometimes fails to correctly indicate a value at the point in time at which the abnormality occurs.

Conventionally, in prevention of this disadvantage, the read interval is always set to be short but this raises a problem in that the RAM capacity necessary for storing the increased amount of data obtained within a constant amount of time increases.

SUMMARY OF THE INVENTION

The present invention solves the above mentioned problems and it is an object of the present invention to provide a self-diagnostic apparatus of vehicles in which diagnostic data to be frozen which correctly indicates a vehicle state upon the detection of an abnormality can be obtained even when an increase in the RAM capacity necessary for storing data obtained within a constant time is suppressed to a minimum.

According to one aspect of the present invention, there is provided a self-diagnostic apparatus of vehicles comprising data detection means for detecting data concerning operation of at least one on-board device carried on a vehicle in the form of diagnostic data necessary for analyzing an abnormality of the on-board device; diagnostic data storing means capable of updating and storing the diagnostic data detected by the data detection means and being operative to keep the data stored even when the ignition switch is turned off; updating period changing means adapted to change the period of updating by the diagnostic data storing means and being operative to detect a rate of change of the diagnostic data so as to update data stored in the diagnostic data storing means at a period which becomes shorter as the detected rate of change grows larger; abnormality detection means for detecting an abnormal state of the on-board device; and inhibition means for inhibiting the diagnostic data from being updated by the diagnostic data storing means after an abnormality of the on-board device is detected by the abnormality detection means.

To describe the above construction of the present invention with reference to FIG. 10, there are provided data detection means for detecting diagnostic data necessary to analyze an abnormality of an on-board device carried on a vehicle, diagnostic data storing means for updating and storing diagnostic data detected by the data detection means at a predetermined updating period and keeping the data stored even when the ignition switch is turned off, abnormality detection means for detecting an abnormal state of the on-board device, inhibition means for inhibiting the diagnostic data from being updated by the diagnostic data storing means after an abnormality of the on-board device is detected by the abnormality detection means, and updating period changing means for detecting a rate of change of the diagnostic data and for shortening the period of updating by the diagnostic data storing means as the rate of change increases.

In the above construction, many sources of diagnostic data pieces are stored, but when any one diagnostic data piece is present which changes greatly in accordance with a state of running of the vehicle, the diagnostic data is updated at a period which becomes shorter as the rate of change grows larger. Accordingly, sufficiently reliable and adequate diagnostic data near a time point at which a device abnormality occurs can be stored.

DESCRIPTION OF THE PREFERRED EMBODIMENTS

Figure 1:
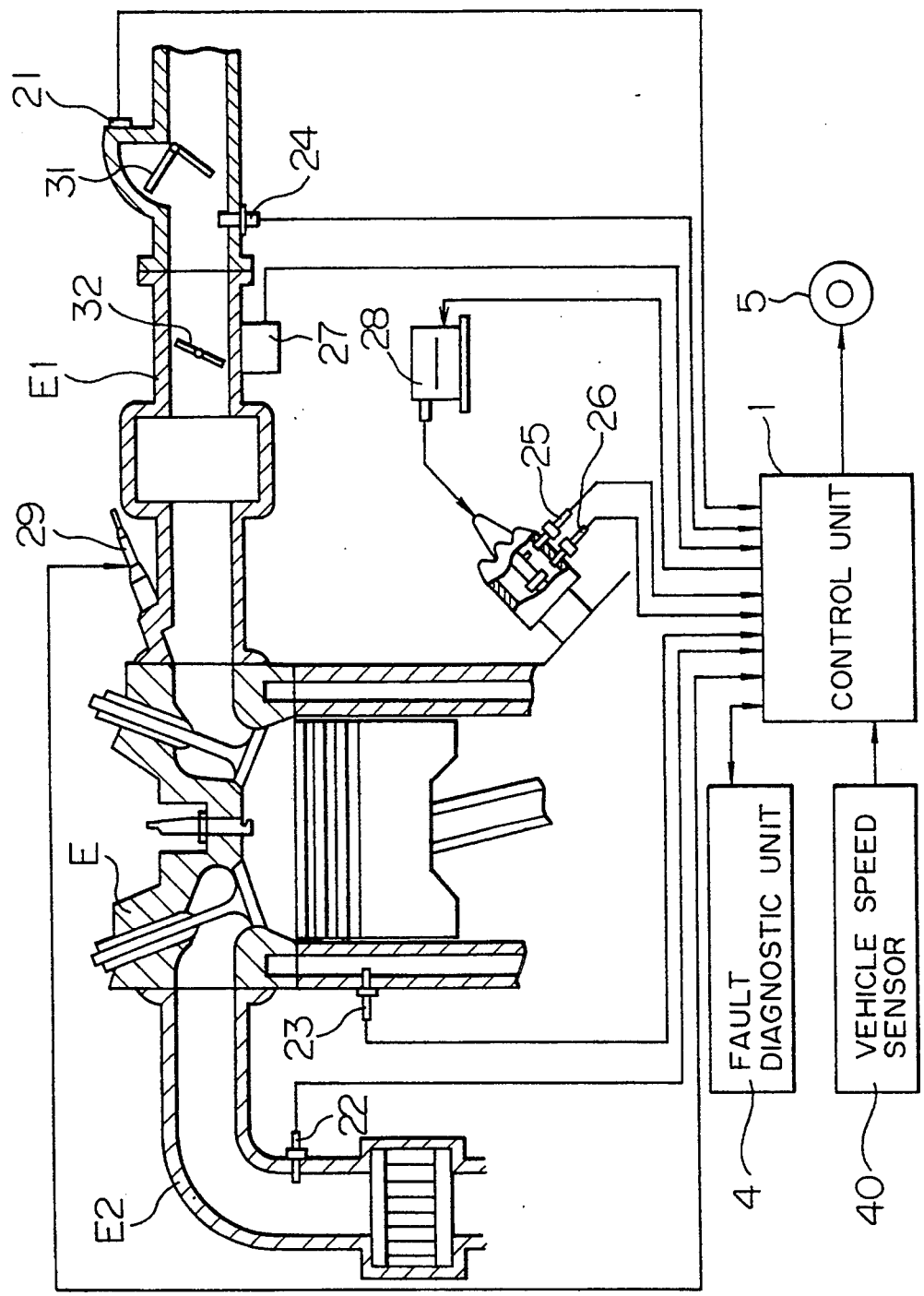
FIG. 1 is a diagram showing an overall construction of a self-diagnostic apparatus.
Figure 2:
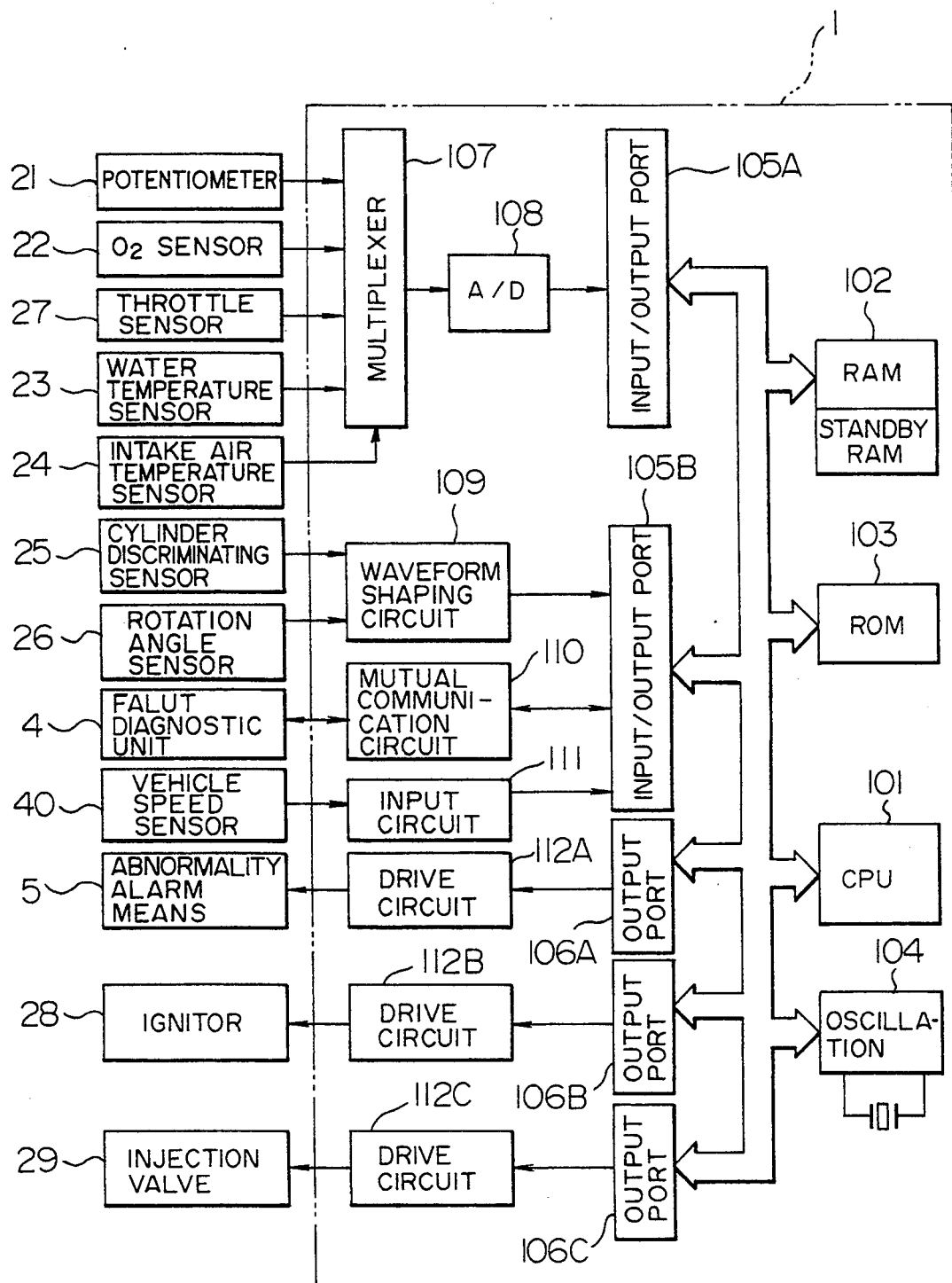
FIG. 2 is schematic diagram of a control unit.

Referring now to FIGS. 1 and 2, an intake pipe E1 of an engine E is provided with a potentiometer 21 of a flow meter 31, which is on the most upstream side of the intake pipe E1, an intake air temperature-sensor 24, a throttle opening sensor 27 of a throttle valve 32 and a fuel injection valve 29. The engine E is provided, at a water jacket, with a water temperature sensor 23, and an exhaust pipe E2 of the engine E is provided with an $O_2$ sensor 22.

A control unit 1 incorporating a CPU 101 is provided and the CPU 101 is coupled to a RAM 102, a ROM 103 for storage of a control program, an oscillator circuit 104, input/output ports 105A and 105B, and output ports 106A, 106B and 106C. The RAM 102 is divided into an ordinary RAM for temporary storage and a standby RAM the contents of which are held even when the ignition key is turned off.

Output signals of the potentiometer 21, the $O_2$ sensor 22, the water temperature sensor 23, the intake air temperature sensor 24 and the throttle sensor 27 are input to the input/output port 105A through a multiplexer 107 and an A/D converter 108. Output signals of a cylinder discriminating sensor 25 and a rotation angle sensor 26 are input to the input/output port 105B through a waveform shaping circuit 109, and an output signal of a vehicle speed sensor 40 is input to the input/output port 105B through an input circuit 111.

An output signal is applied to an ignitor 28 through the output port 106B and a drive circuit 112B, and an output signal is applied to the fuel injection valve 29 through the output port 106C and a drive circuit 112C.

When an abnormality of an individual vehicle on-board device is detected through the procedure to be described later, an output signal is sent to an abnormality alarm means 5 through the output port 106A and drive circuit 112A. At the same time, diagnostic data necessary to analyze the device abnormality is exchanged between a fault diagnostic unit 4 and the CPU through the input/output port 105B and a mutual communication circuit 110 as will be described later.

Figure 3:
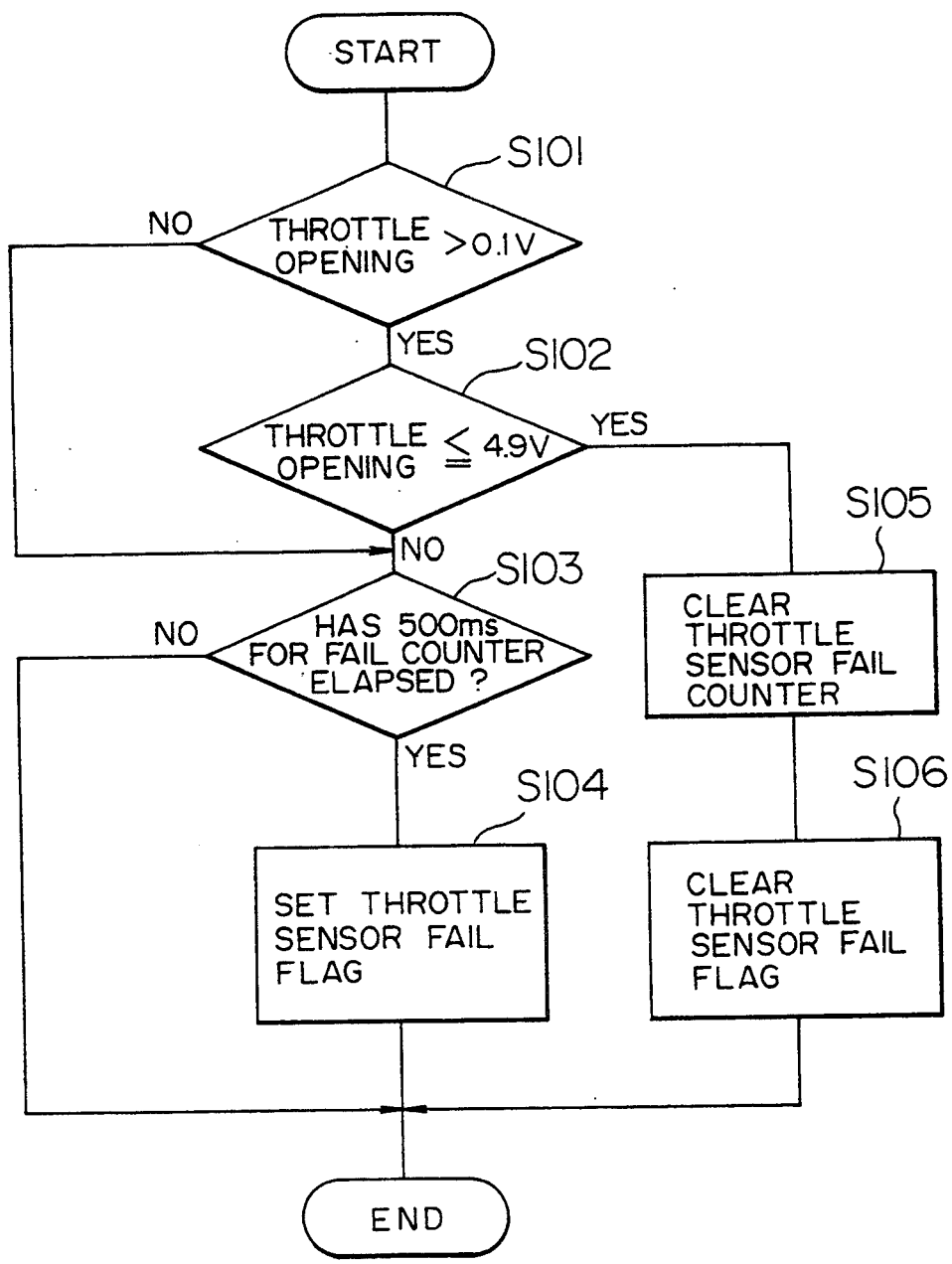
FIG. 3 is a program flow chart.

In the present embodiment, abnormalities of various sensors, various actuators and drive circuits can be detected but the following description will be given by way of example of the throttle sensor 27. FIG. 3 particularly shows an abnormality detection program for the throttle sensor 27. In steps S101 and S102, it is checked whether a throttle opening signal falls within a range of from 0.1 V to 4.9 V and if the signal is within the range, a fail counter is cleared and a fail flag, typically present in the RAM, is cleared (S105 and S106). On the other hand, if the time for the signal to lie outside the aforementioned range exceeds 500 ms (S103), a throttle sensor abnormality is determined and the fail flag is set (S104).

Figure 4:
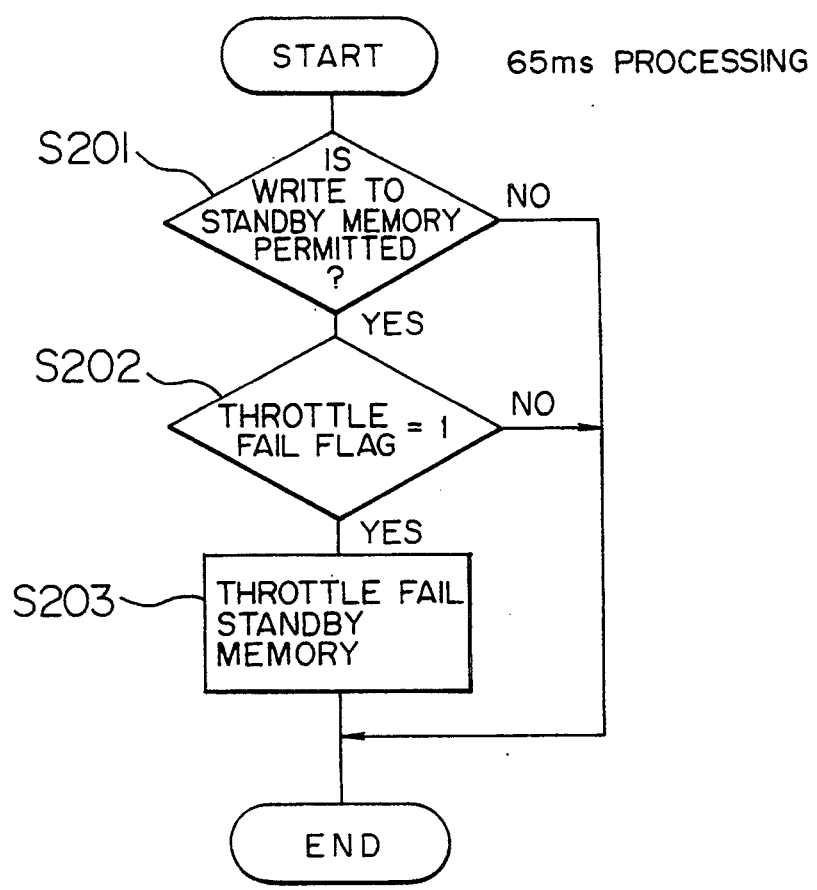
FIG. 4 is a program flow chart.

When the fail flag is set, the flag is set in the standby RAM in accordance with a program as shown in FIG. 4 which is started every 65 ms. In S201, it is checked whether a write to the standby RAM is permitted, and with the fail flag set, a predetermined bit of the standby RAM is set (S202 and S203) to memorize the fact that an abnormality of the specified device has been detected.

Figure 5:
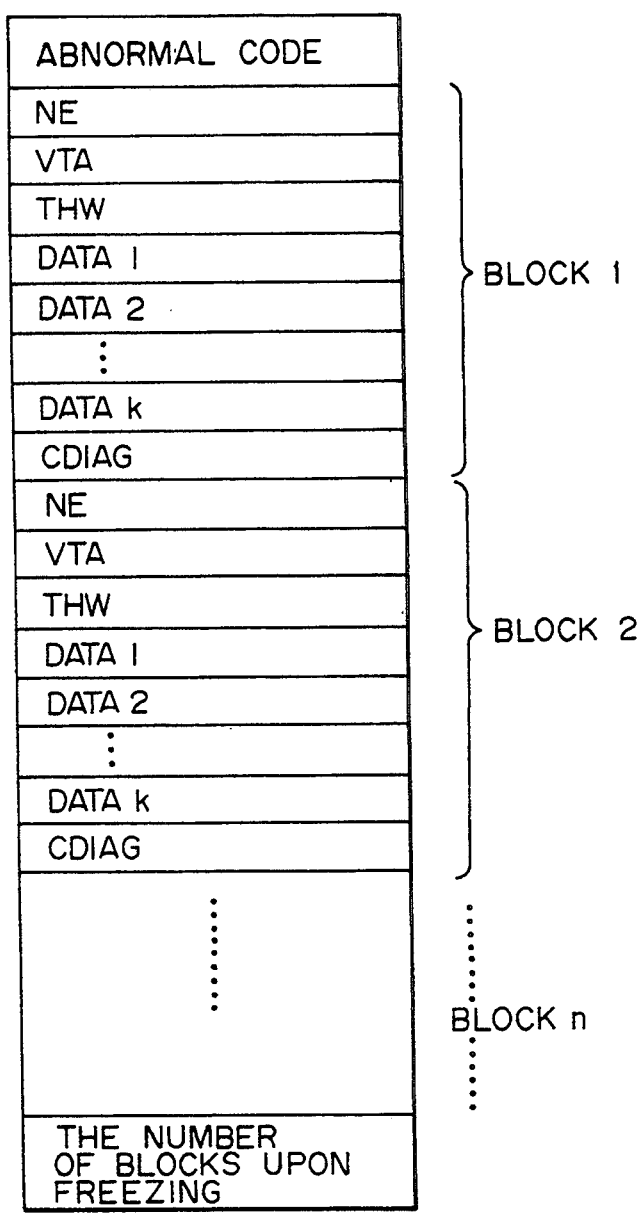
FIG. 5 is a diagram showing a memory format of a standby RAM.

FIG. 5 shows a memory format of the standby RAM in which diagnostic data pieces such as an engine revolution number (NE), throttle opening (VTA) and engine water temperature (THW) are sequentially stored at respective addresses within a frame. The frame is divided into n blocks, and diagnostic data pieces filling each frame over n periods are input and stored as a frame of diagnostic data. Sequential updating of the diagnostic data pieces forming each frame is carried out beginning with the oldest block. Accordingly, when data is frozen because of the detection of an abnormality, data pieces over n periods before the abnormality detection are maintained in sequential order.

In each block, an area for storing a count value of a counter CDIAG to be described later is set up, an area for a heading address of a frame is set up as an area set with an abnormal code, and an area for a final address is set up as an area set with the number of blocks which prevail when the abnormal code is set and the data pieces are frozen. Upon the detection of an abnormality of any diagnostic data, a corresponding abnormal code is set to a high level.

Figure 6:
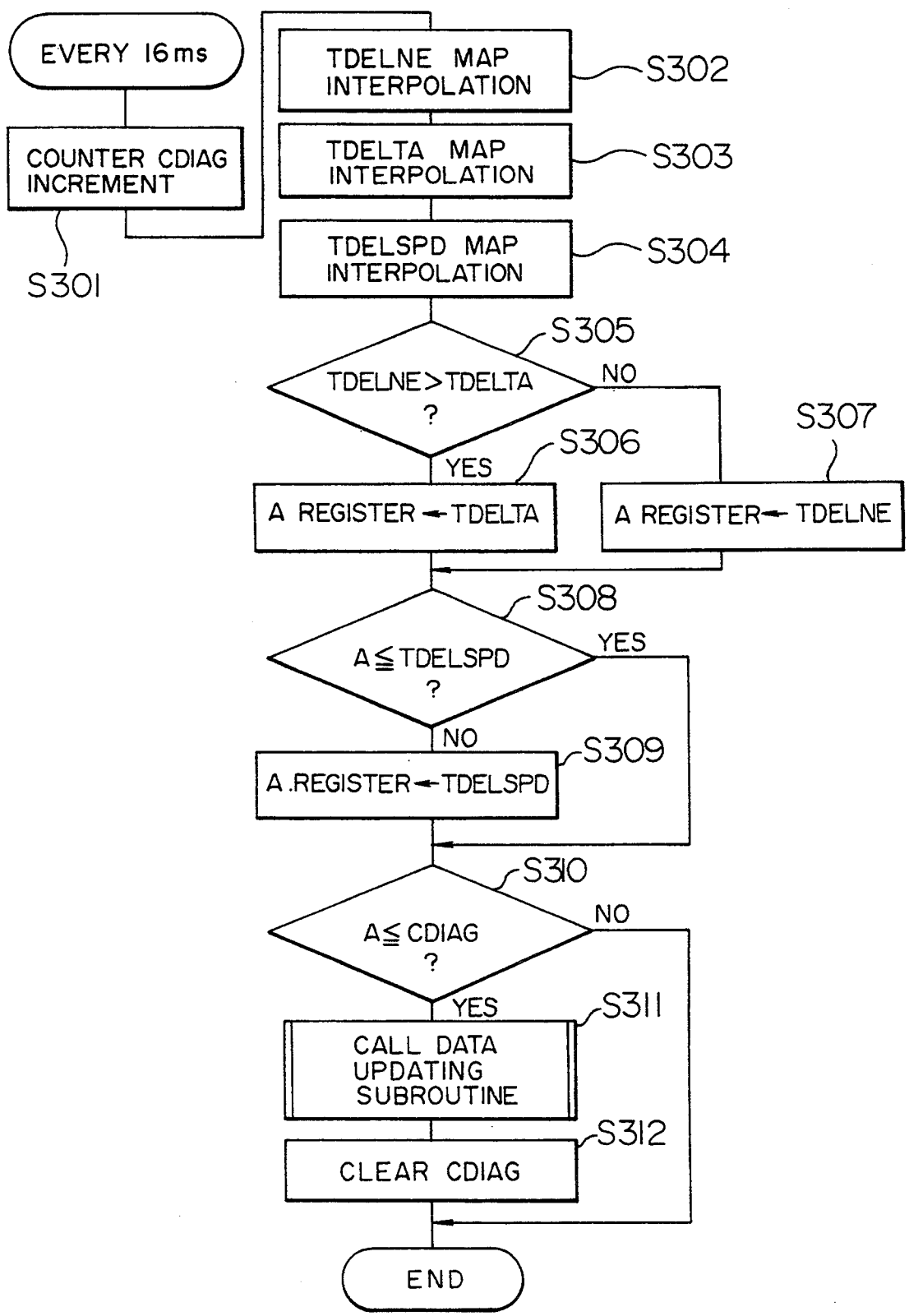
FIG. 6 is a program flow chart.

FIG. 6 shows a program for controlling the write process into the standby RAM. This program is started every 16 ms. In S301, a counter CDIAG is incremented and in S302 to S304, maps TDELNE, TDELTA and TDELSPD are each subjected to an interpolation operation to determine a period for of inputting the diagnostic data.

TDELNE represents an input period of a rate of change $\Delta NE$ of an engine revolution number and input periods corresponding to predetermined rates of change of the revolution number are stored in the form of a map in advance as shown in Table 1. Similarly, TDELTA represents an input period of a rate of change $\Delta TA$ of throttle opening and a map of corresponding input periods is shown in Table 2; and TDELSPD represents an input period of a rate of change $\Delta SPD$ of vehicle speed and a map of corresponding input periods is shown in Table 3.

TABLE 1

| $|\Delta NE|$ | 0 | 20 | 50 | 200 | rpm/s |
|---|---|---|---|---|---|
| TDELNE | 4000 | 1000 | 500 | 16 | ms |

TABLE 2

| $|\Delta TA|$ | 0 | 10 | 20 | 30 | o/s |
|---|---|---|---|---|---|
| TDELTA | 4000 | 1000 | 500 | 16 | ms |

TABLE 3

| $|\Delta SPD|$ | 0 | 2 | 4 | 6 | km/h² |
|---|---|---|---|---|---|
| TDELSPD | 4000 | 1000 | 500 | 16 | ms |

In S305 to S309, the shortest one of the input periods TDELNE, TDELTA and TDELSPD is stored in a register A. Then, it is not until the value of the counter CDIAG exceeds the value of the register A that a data updating subroutine is executed and the counter CDIAG is cleared (S310, S311 and S312).

Figure 7:
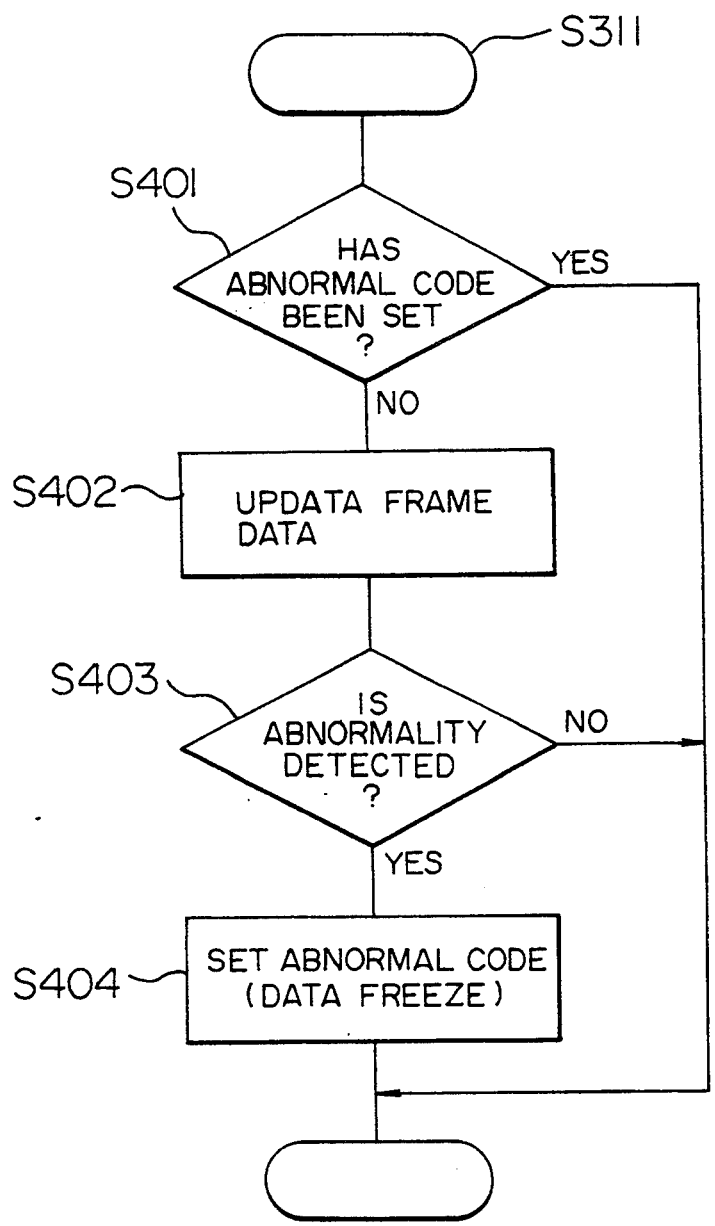
FIG. 7 is a program flow chart.
Figure 8A:
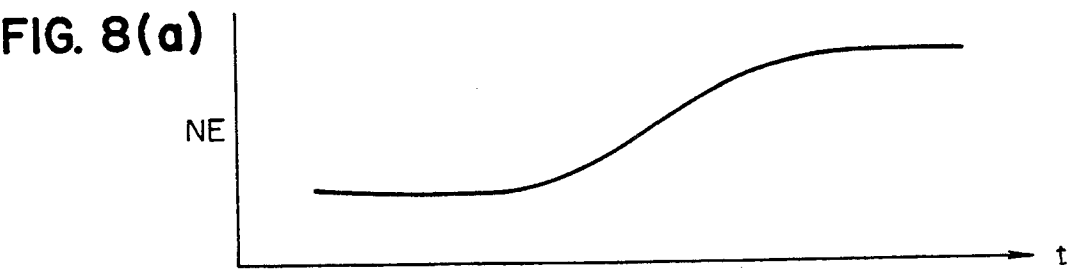
FIG. 8 is a time chart of various signals.
Figure 8B:
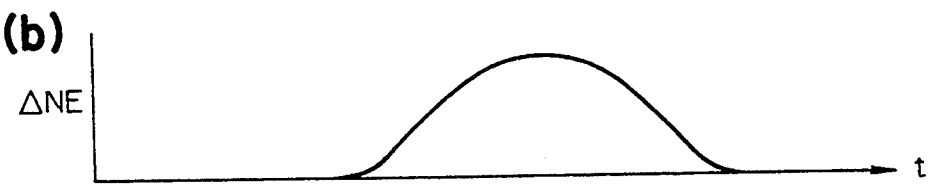
Figure 8C:
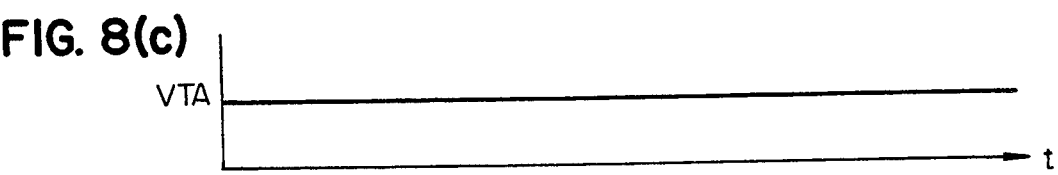
Figure 8D:
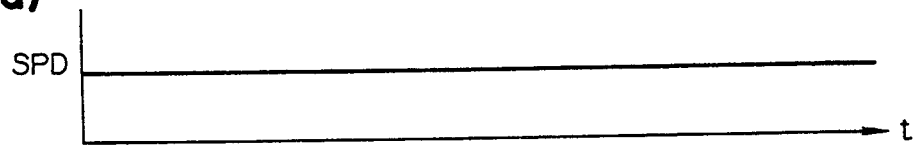
Figure 8E:
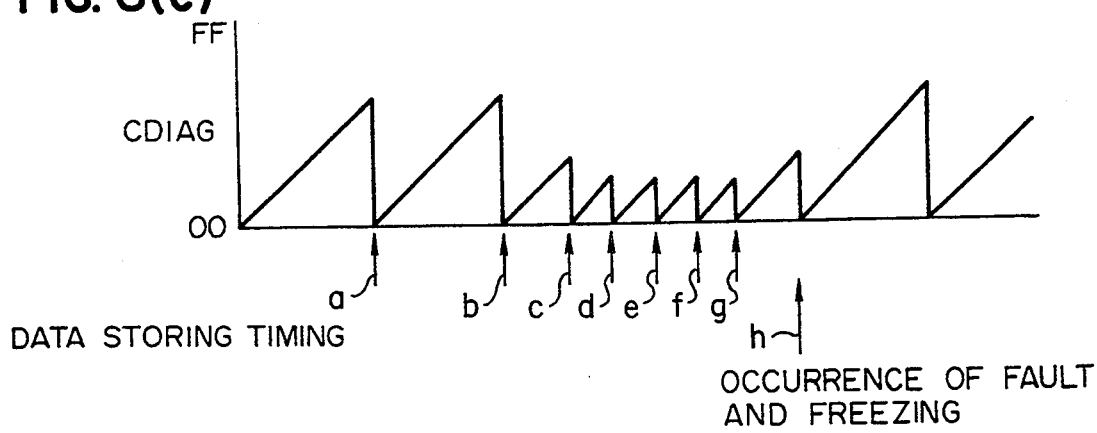

Details of the data updating subroutine are shown in FIG. 7. In S401, it is checked whether an abnormal code is set in a frame (FIG. 5) of the standby RAM to indicate a data freeze state. If no freeze state takes place, data in the oldest block is updated in S402 to newly input diagnostic data and besides a value of CDIAG at that time is written in the standby RAM.

In S403, it is checked whether a predetermined bit of the standby RAM is set to indicate that an abnormality of a specified device is detected. If the abnormality is detected, an abnormal code is set in S404 and besides, in S402, the number of updated blocks is written in the standby RAM to inhibit data updating, thus establishing a freeze state.

Through the above procedure, the data updating subroutine is executed at the shortest one of the periods determined in accordance with the rates of change of three diagnostic data pieces of high importance, so that new diagnostic data is read and data is updated.

This will be explained with reference to FIG. 8. The Figure shows a case where the engine revolution number (NE) changes over time, indicating that the execution period of the data updating subroutine (as represented by the arrows a-h) is shortened as the rate of change of the engine revolution number increases and the counter CDIAG is cleared each time that the rate is incremented.

When the rate of change of the diagnostic data increases, the data input period is shortened in accordance with an increased rate in this manner and therefore sufficient diagnostic data pieces are frozen upon the detection of an abnormality of a device and obtained over n periods near a time point at which the abnormality occurs and the thus obtained data pieces correctly reflect a vehicle state immediately before the detection of the abnormality. Thus, the vehicle state immediately before the detection of the abnormality can be analyzed in detail with an efficient use of a limited memory area ensured, thereby making it possible to prevent an increase in the memory size.

Figure 9:
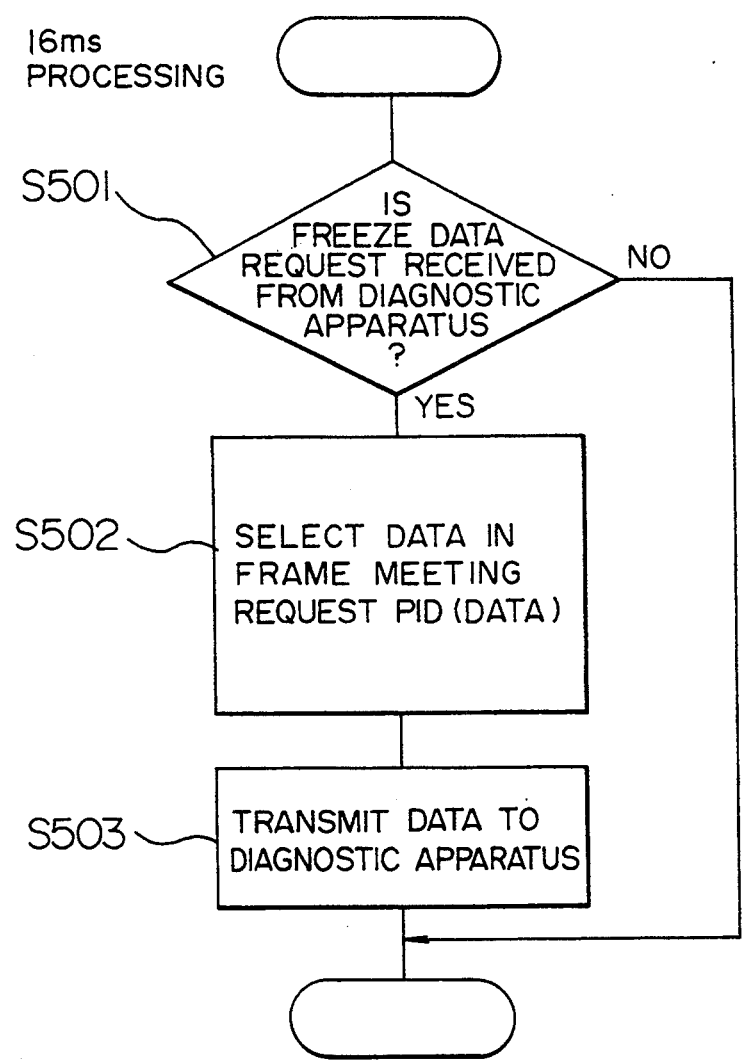
FIG. 9 is a program flow chart.
Figure 10:
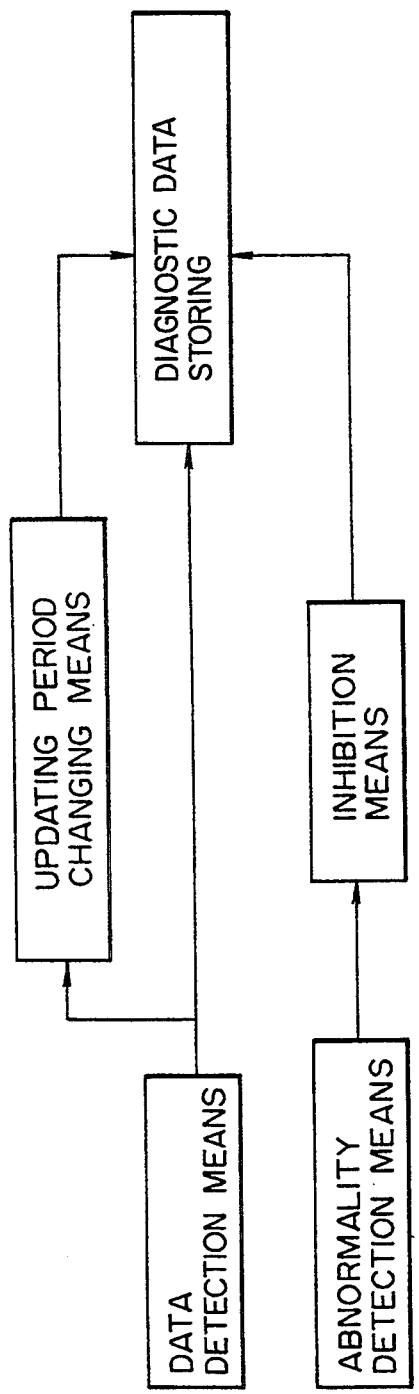
FIG. 10 is a block diagram for explaining one aspect of the present invention.

FIG. 9 shows a program used to transmit diagnostic data to a fault diagnostic apparatus connected after the driver alights from the vehicle and this program is started every 16 ms. In S501, it is checked whether a request for-frozen diagnostic data is received from the diagnostic apparatus and diagnostic data meeting a request PID is selected (S502). The PID request is a request for diagnostic data issued in ID form from the diagnostic apparatus and for example, PID1 represents the engine revolution number and PID2 the vehicle speed. The selected diagnostic data is transmitted to the diagnostic apparatus (S503).

In the foregoing embodiment, diagnostic data pieces over n periods are normally maintained but it is not always necessary that n be plural.

As described above, according to the self-diagnostic apparatus according to the present invention, when diagnostic data changes abruptly, the data updating period is shortened to ensure that a limited RAM capacity can be used efficiently to obtain frozen diagnostic data which correctly reflects a vehicle state upon the detection of an abnormality.

We claim:

1. A self-diagnostic apparatus for a vehicle comprising:
    data detection means for detecting diagnostic data concerning an operation parameter of at least one device in said vehicle;
    diagnostic data storage means for updating and storing said diagnostic data and for maintaining said stored diagnostic data even when an ignition switch of said vehicle is turned off;
    updating period changing means for changing a time period of updating by said diagnostic data storage means, and for detecting a rate of change of said diagnostic data, said time period being changed to update data stored in said diagnostic data storage means at an updating time period which decreases as said detected rate of change increases;
    abnormality detection means for detecting an abnormal operating state in accordance with said diagnostic data of said device; and
    inhibition means for inhibiting said diagnostic data from being updated after said abnormal operating state is detected.

2. A self-diagnostic apparatus for a vehicle according to claim 1, wherein said updating period changing means includes:
    means for detecting a rate of change of each of a plurality of pieces of said diagnostic data representing a respective operating condition of a plurality of devices in said vehicle;
    means for determining a period of time for updating each of said plurality of pieces of said diagnostic data in accordance with said respective detected rate of change; and
    means for updating said diagnostic data in said diagnostic data storage means at a time period equal to a shortest one of said periods of time for updating each said plurality of pieces of said diagnostic data.

3. A self-diagnostic apparatus for a vehicle according to claim 2, wherein:
    one of said plurality of devices is a rotation angle sensor; and
    said diagnostic data includes an engine revolution number NE.

4. A self-diagnostic apparatus for a vehicle according to claim 2, wherein:
    one of said plurality of devices is a throttle sensor; and
    said diagnostic data includes a throttle opening TA.

5. A self-diagnostic apparatus for a vehicle according to claim 2, wherein:
    one of said plurality of devices is a vehicle speed sensor; and
    said diagnostic data includes a speed of said vehicle.

6. A self-diagnostic apparatus for a vehicle according to claim 2, wherein said updating period changing means includes:
    first memory means for storing a first period of time for updating a first piece of said diagnostic data in accordance with a rate of change of an engine revolution number;
    second memory means for storing a second period of time for updating a second piece of said diagnostic data in accordance with a rate of change of a throttle opening;
    third memory means for storing a third period of time for updating a third piece of said diagnostic data in accordance with a rate of change of a vehicle speed;
    means for reading said first, second and third periods of time stored in said first, second and third memory means;
    shortest period storage means for storing a shortest one of said first, second and third time periods; and
    counter means for counting a number of time periods stored.

7. A self-diagnostic apparatus for a vehicle according to claim 1, wherein said diagnostic data storage means stores said updating time period.

8. A self-diagnostic apparatus for a vehicle according to claim 1, wherein said updating period changing means includes:
    first memory means for storing a first period of time for updating a first piece of said diagnostic data in accordance with a rate of change of an engine revolution number;
    second memory means for storing a second period of time for updating a second piece of said diagnostic data in accordance with a rate of change of a throttle opening;

third memory means for storing a third period of time for updating a third piece of said diagnostic data in accordance with a rate of change of a vehicle speed;

means for reading said first, second and third periods of time stored in said first, second and third memory means;

shortest period storage means for storing a shortest one of said first, second and third time periods; and counter means for counting a number of time periods stored.

* * * * *